United States Patent
Goyal et al.

(10) Patent No.: US 11,062,240 B2
(45) Date of Patent: Jul. 13, 2021

(54) DETERMINING OPTIMAL WORKFORCE TYPES TO FULFILL OCCUPATIONAL ROLES IN AN ORGANIZATION BASED ON OCCUPATIONAL ATTRIBUTES

(71) Applicant: Accenture Global Solutions Limited, Dublin (IE)

(72) Inventors: Jitesh Goyal, Dublin (IE); Benedikt M. Golla, Dublin (IE); Chahrazed Bouhini, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 498 days.

(21) Appl. No.: 15/941,882

(22) Filed: Mar. 30, 2018

(65) Prior Publication Data
US 2019/0303836 A1 Oct. 3, 2019

(51) Int. Cl.
*G06Q 10/06* (2012.01)
*G06N 7/00* (2006.01)
*G06N 3/08* (2006.01)

(52) U.S. Cl.
CPC ....... *G06Q 10/063112* (2013.01); *G06N 3/08* (2013.01); *G06N 7/005* (2013.01)

(58) Field of Classification Search
CPC .... G06Q 10/063112; G06N 7/00; G06N 3/08; G06N 3/0445; G06N 3/0454; G06N 3/0481
See application file for complete search history.

(56) References Cited

U.S. PATENT DOCUMENTS

| | | | | |
|---|---|---|---|---|
| 8,914,383 | B1* | 12/2014 | Weinstein | G06Q 10/1053 705/7.42 |
| 2003/0139956 | A1* | 7/2003 | Guenther | G06Q 10/06398 705/7.13 |
| 2005/0273357 | A1* | 12/2005 | Barnes | G06Q 10/0633 705/7.29 |
| 2013/0297363 | A1* | 11/2013 | Leitch | G06Q 10/06 705/7.14 |

(Continued)

OTHER PUBLICATIONS

"Target Training With Soft Computing Tools", by Jussi Kantola, Antti Piirto, Jarmo Toivonen, Yoon Chang, and Hannu Vanharanta; Journal of Computational Science, 2(2011), p. 207-215.*

(Continued)

*Primary Examiner* — Pan G Choy
(74) *Attorney, Agent, or Firm* — Harrity & Harrity, LLP

(57) ABSTRACT

A device receives occupational activity descriptions and occupational role attributes, and processes the occupational activity descriptions to generate estimated occupational activity attribute values. The device trains a neural network model based on the estimated occupational activity attribute values to generate a trained neural network model, and receives a new activity description for a new role in an organization. The device processes the new activity description, with the trained neural network model, to generate estimated new activity attribute values, and processes the estimated new activity attribute values, with the logistic regression model, to generate probabilities that the new role is suitable for different workforce types. The device determines a workforce recommendation for the new role based on the probabilities that the new role is suitable for the different workforce types.

21 Claims, 12 Drawing Sheets

(56) References Cited

U.S. PATENT DOCUMENTS

| | | | |
|---|---|---|---|
| 2017/0249594 A1* | 8/2017 | Ortigas | G06Q 10/105 |
| 2018/0129937 A1* | 5/2018 | Bradbury | G06N 3/04 |
| 2018/0288086 A1* | 10/2018 | Amiri | G06F 40/126 |
| 2019/0164133 A1* | 5/2019 | Chakraborty | G06Q 10/1053 |
| 2019/0251492 A1* | 8/2019 | Bender | G06Q 10/06312 |
| 2019/0266497 A1* | 8/2019 | Yuan | G06Q 50/01 |
| 2019/0303835 A1* | 10/2019 | Saha | G06Q 10/06311 |
| 2019/0362025 A1* | 11/2019 | Zhou | G06Q 10/1053 |

OTHER PUBLICATIONS

"Occupational Safety and Health Implementation: Between Policy and Practice in Lebanon", by Manal Maroun Azzi, Faculty of Health and Medical Sciences Division of Health and Social CAre, University of Surrey, Aug. 2009.*

\* cited by examiner

DETERMINING OPTIMAL WORKFORCE TYPES TO FULFILL OCCUPATIONAL ROLES IN AN ORGANIZATION BASED ON OCCUPATIONAL ATTRIBUTES

BACKGROUND

Artificial intelligence describes different ways that a machine interacts with a world around it. Through advanced, human-like intelligence (e.g., provided by software and hardware), an artificial intelligence model can mimic human behavior or perform tasks as if the artificial intelligence model were human. Machine learning is an approach, or a subset, of artificial intelligence, with an emphasis on learning rather than just computer programming. In machine learning, a device utilizes complex models to analyze a massive amount of data, recognize patterns among the data, and make a prediction without requiring a person to program specific instructions. Deep learning is a subset of machine learning, and utilizes massive amounts of data and computing power to simulate deep neural networks. Essentially, these networks classify datasets and find correlations between the datasets. With newfound knowledge (acquired without human intervention), deep learning can apply the knowledge to other datasets.

SUMMARY

According to some implementations, a device may include one or more memories, and one or more processors, communicatively coupled to the one or more memories, to receive occupational activity descriptions and occupational role attributes, and process the occupational activity descriptions to generate estimated occupational activity attribute values. The one or more memories may train a neural network model based on the estimated occupational activity attribute values to generate a trained neural network model, and may receive a new activity description for a new role in an organization. The one or more processors may process the new activity description, with the trained neural network model, to generate estimated new activity attribute values, and may process the estimated new activity attribute values, with the logistic regression model, to generate probabilities that the new role is suitable for different workforce types. The one or more processors may determine a workforce recommendation for the new role based on the probabilities that the new role is suitable for the different workforce types.

According to some implementations, a non-transitory computer-readable medium may store instructions that include one or more instructions that, when executed by one or more processors, cause the one or more processors to receive occupational activity descriptions and occupational role attributes from one or more occupational databases, and process the occupational activity descriptions to generate estimated occupational activity attribute values. The one or more instructions may cause the one or more processors to train a neural network model based on the estimated occupational activity attribute values to generate a trained neural network model, and receive, from a user device, a new activity description for a new role in an organization. The one or more instructions may cause the one or more processors to process the new activity description, with the trained neural network model, to generate estimated new activity attribute values, and process the occupational role attributes, with a logistic regression model, to generate probabilities that roles are suitable for different workforce types. The one or more instructions may cause the one or more processors to process the estimated new activity attribute values, with the logistic regression model, to generate probabilities that the new role is suitable for the different workforce types, and determine a workforce recommendation for the new role based on the probabilities that the roles are suitable for the different workforce types and the probabilities that the new role is suitable for the different workforce types. The one or more instructions may cause the one or more processors to provide the workforce recommendations to the user device.

According to some implementations, a method may include receiving, by a device, occupational activity descriptions, occupational role attributes, and a new activity description for a new role in an organization, and processing, by the device, the occupational activity descriptions to generate estimated occupational activity attribute values. The method may include training, by the device, a first model based on the estimated occupational activity attribute values to generate a trained first model, and processing, by the device, the new activity description, with the trained first model, to generate estimated new activity attribute values. The method may include processing, by the device, the occupational role attributes, with a second model, to generate probabilities that roles are suitable for different workforce types, and processing, by the device, the estimated new activity attribute values, with the second model, to generate probabilities that the new role is suitable for the different workforce types. The method may include determining, by the device, a workforce recommendation for the new role based on the probabilities that the roles are suitable for the different workforce types and the probabilities that the new role is suitable for the different workforce types, and providing, by the device and for display, information indicating the workforce recommendation.

DETAILED DESCRIPTION

Figure 1A:
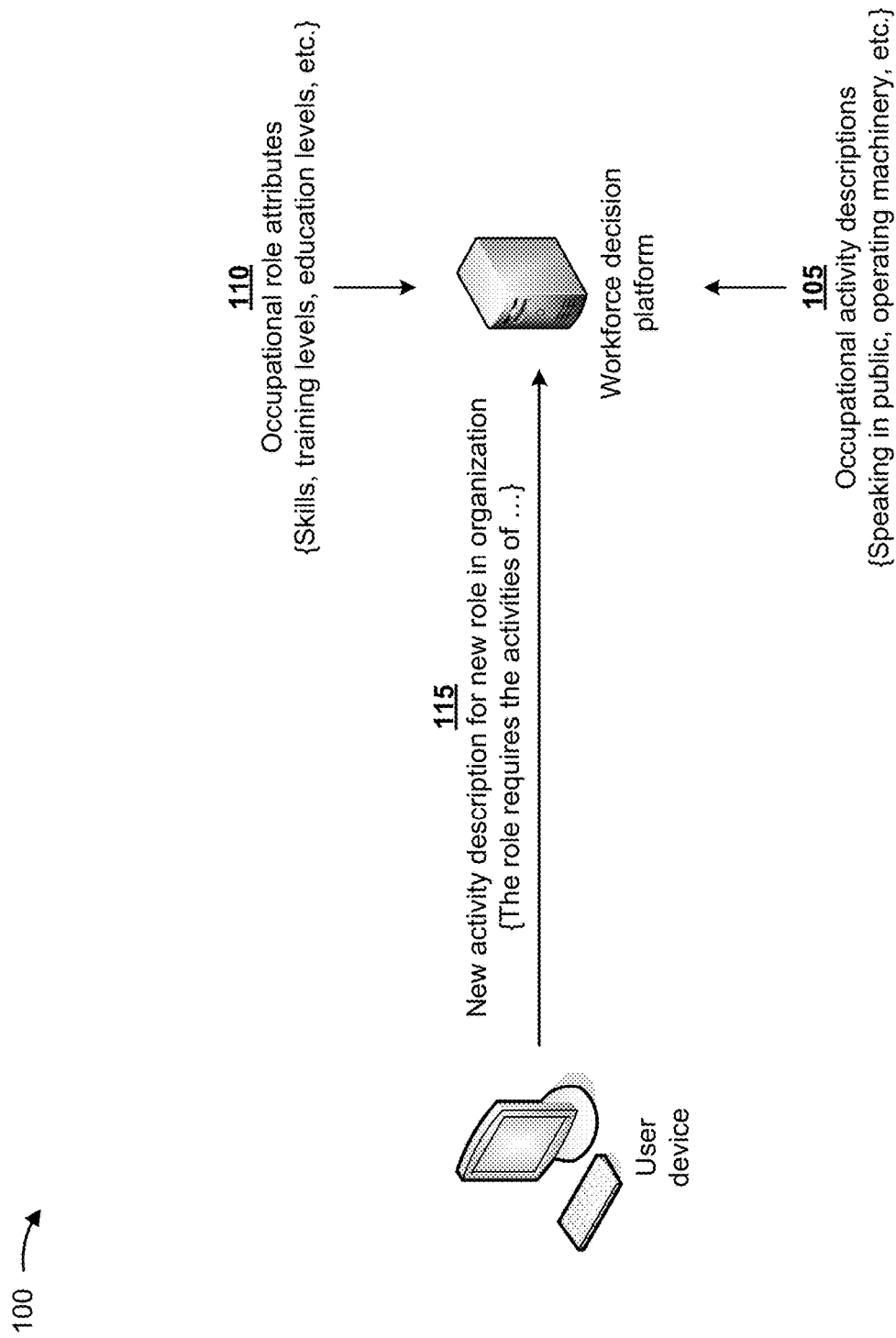
FIGS. 1A-1I are diagrams of an overview of an example implementation described herein.

The following detailed description of example implementations refers to the accompanying drawings. The same reference numbers in different drawings may identify the same or similar elements.

Determining a workforce type (e.g., full-time employee, part-time employee, contract employee, hoteling employee, a crowd worker, and/or the like) for a new or existing occupational role or specific occupational activities (e.g., with new specific duties or activities) in an organization may be determined by human resources personnel of the organization. The human resources personnel may consult occupational databases (e.g., the occupational information network (O*NET) database) when determining a workforce type for a new occupational role. Unfortunately, many times such occupational databases provide little or no guidance to the human resources personnel making workforce type determinations.

Some implementations described herein provide a workforce decision platform that determines optimal workforce types to fulfill occupational roles and activities in an organization based on occupational attributes. For example, the workforce decision platform may receive occupational activity descriptions, occupational roles, activities associated with one or more roles, occupational role attributes, and a new activity description for a new role in an organization. The workforce decision platform may process the occupational activity descriptions to generate estimated occupational activity attribute values, and may train a neural network model based on the estimated occupational activity attribute values to generate a trained neural network model. The workforce decision platform may utilize the trained neural network model with the new activity description to generate estimated new activity attribute values, and may utilize a linear classification model (e.g., a logistic regression model) with the occupational role attributes to generate probabilities that roles are suitable for different workforce types. The workforce decision platform may utilize a logistic regression model with the estimated new activity attribute values to generate probabilities that the new role is suitable for the different workforce types. The workforce decision platform may determine a workforce recommendation for the new role or activity based on the probabilities that the roles and the new role are suitable for the different workforce types.

In some implementations, the workforce decision platform may provide recommendations for roles and individual activities, since roles may be ill-suited for non-standard workers (e.g., crowd workers) and individual activities within a role may be suitable for non-standard workers.

In some implementations, the workforce decision platform may provide recommendations that are explainable. The workforce decision platform may utilize a logistic regression model that estimates a feasibility of sourcing roles from various non-standard workers and assigns effects (e.g., coefficients) to role attributes. This enables the workforce decision platform to identify a role for which non-standard workers are rejected because the role involves contact with customers, a role for which non-standard worker are recommended in part because the role is highly structured, and/or the like. Thus, the workforce decision platform may determine workforce recommendations, for roles and individual activities, which are interpretable.

In some implementations, references to a neural network model and a logistic regression model are examples of specific types of models that might be used and, in practice, other types of models might be used to achieve similar results.

FIGS. 1A-1I are diagrams of an overview of an example implementation 100 described herein. As shown in FIG. 1A, a user device may be associated with a workforce decision platform. As shown in FIG. 1A, and by reference number 105, the workforce decision platform may receive occupational activity descriptions from one or more resources, such as occupational databases (e.g., the O*NET database, the European Skills, Competences, Qualifications and Occupations (ESCO) database, the world database of International Standard Classification of Occupations (ISCO) occupations (WISCO), and/or the like). In some implementations, the occupational activity descriptions may include information identifying activities associated with different occupations (e.g., speaking in public, operating machinery, handling confidential information, and/or the like). In some implementations, an occupational role may be represented by a list of attributes (e.g., over two-hundred attributes) that are grouped in categories (e.g., skills, abilities, work activities, work style, education, and/or the like). Each role may include a value score for each attribute in each category depending on how likely the role requires a score for a given attribute. However, an activity in a role may not include a value score for attributes in the occupational databases.

As further shown in FIG. 1A, and by reference number 110, the workforce decision platform may receive occupational role attributes from one or more resources, such as occupational databases. In some implementations, the occupational role attributes may include information identifying attributes of different roles associated with occupations (e.g., skills, training levels, education levels, abilities, and/or the like). In some implementations, the occupational role attributes may be associated with attribute values (e.g., occupational role attribute values). In some implementations, the occupational activity descriptions and/or the occupational role attributes may be utilized by the workforce decision platform to train models (e.g., a neural network model, a logistic regression model, and/or the like), as described elsewhere herein.

As further shown in FIG. 1A, and by reference number 115, a user of the user device (e.g., via a user interface provided to the user) may cause the user device to provide, to the workforce decision platform, a new activity description for a new role in an organization (e.g., a company, a government agency, an educational institution, and/or the like). In some implementations, the activity description for the new role may include information identifying activities associated with performing the new role in the organization (e.g., the new role requires the activities of performing accounting tasks, such as calculating a return on investment, determining capital expenditures, etc.).

In some implementations, the occupational activity descriptions and/or the occupational role attributes may not be stored in the user device, but the user device may cause the occupational activity descriptions and/or the occupational role attributes to be provided from the one or more resources, storing the occupational activity descriptions and/or the occupational role attributes, to the workforce decision platform. In some implementations, the workforce decision platform may receive the occupational activity descriptions, the occupational role attributes, and/or the new activity description, and may store the occupational activity descriptions, the occupational role attributes, and/or the new activity description in a memory associated with the workforce decision platform.

Figure 1B:
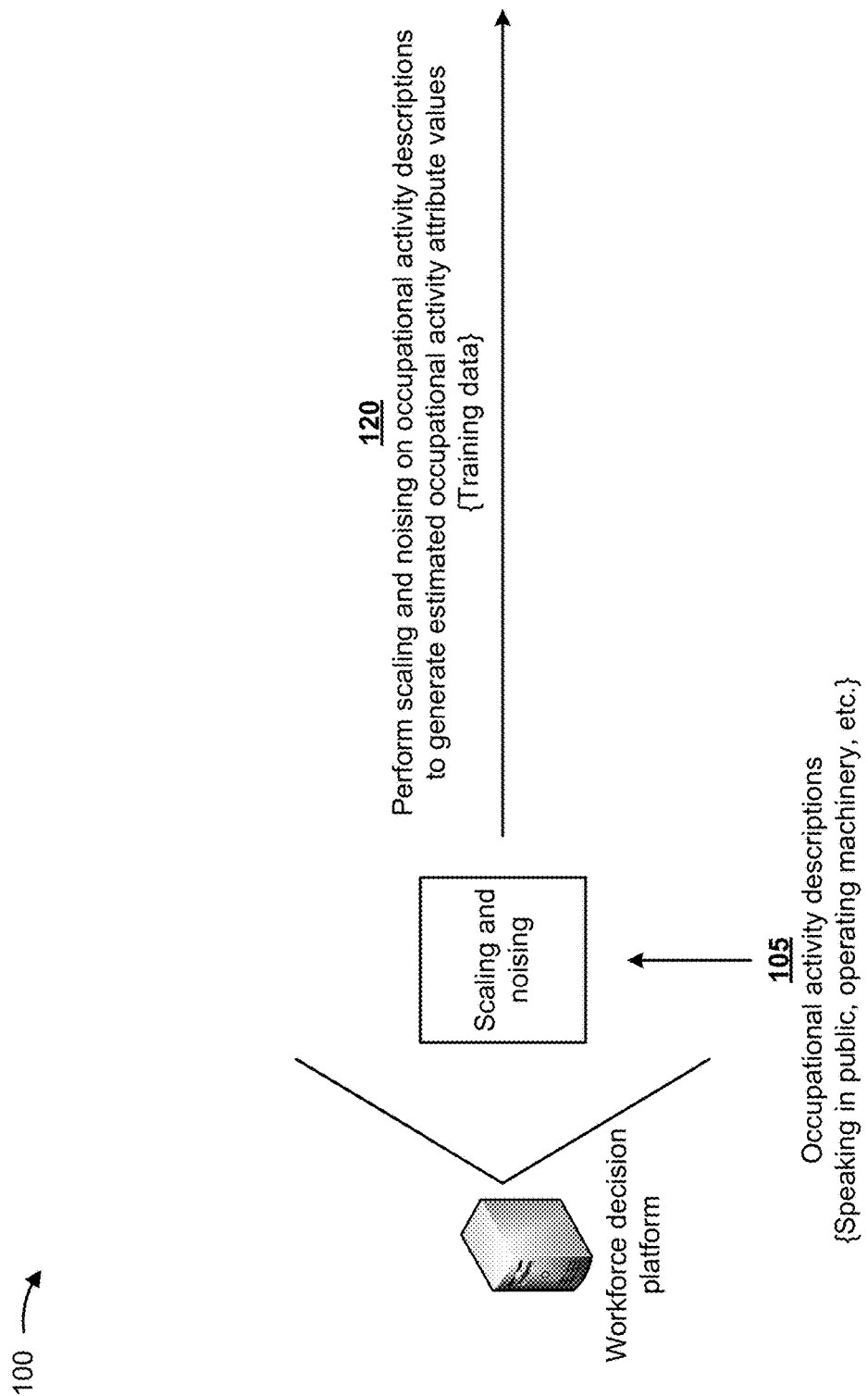

As shown in FIG. 1B, and by reference numbers 105 and 120, the workforce decision platform may perform scaling and noising on the occupational activity descriptions to generate estimated occupational activity attribute values, as described elsewhere herein. In some implementations, the occupational activity descriptions may be associated with attributes of different occupational roles (e.g., occupational activity attributes), and the occupational activity attributes may be associated with attribute values (e.g., occupational attribute values). In some implementations, the workforce decision platform may apply non-linear scaling to the occupational attribute values in order to scale occupational activity attribute values.

In some implementations, each attribute value may be associated with a quantity of tasks associated with a corresponding occupational role, but the occupational databases may not include scores associated with the tasks. The workforce decision platform may introduce noise to the scaled occupational activity attribute values in order to generate the initial estimates of the occupational activity attribute values. In some implementations, the estimated occupational activity attribute values may be utilized as training data for a neural network model, as described elsewhere herein.

Figure 1C:
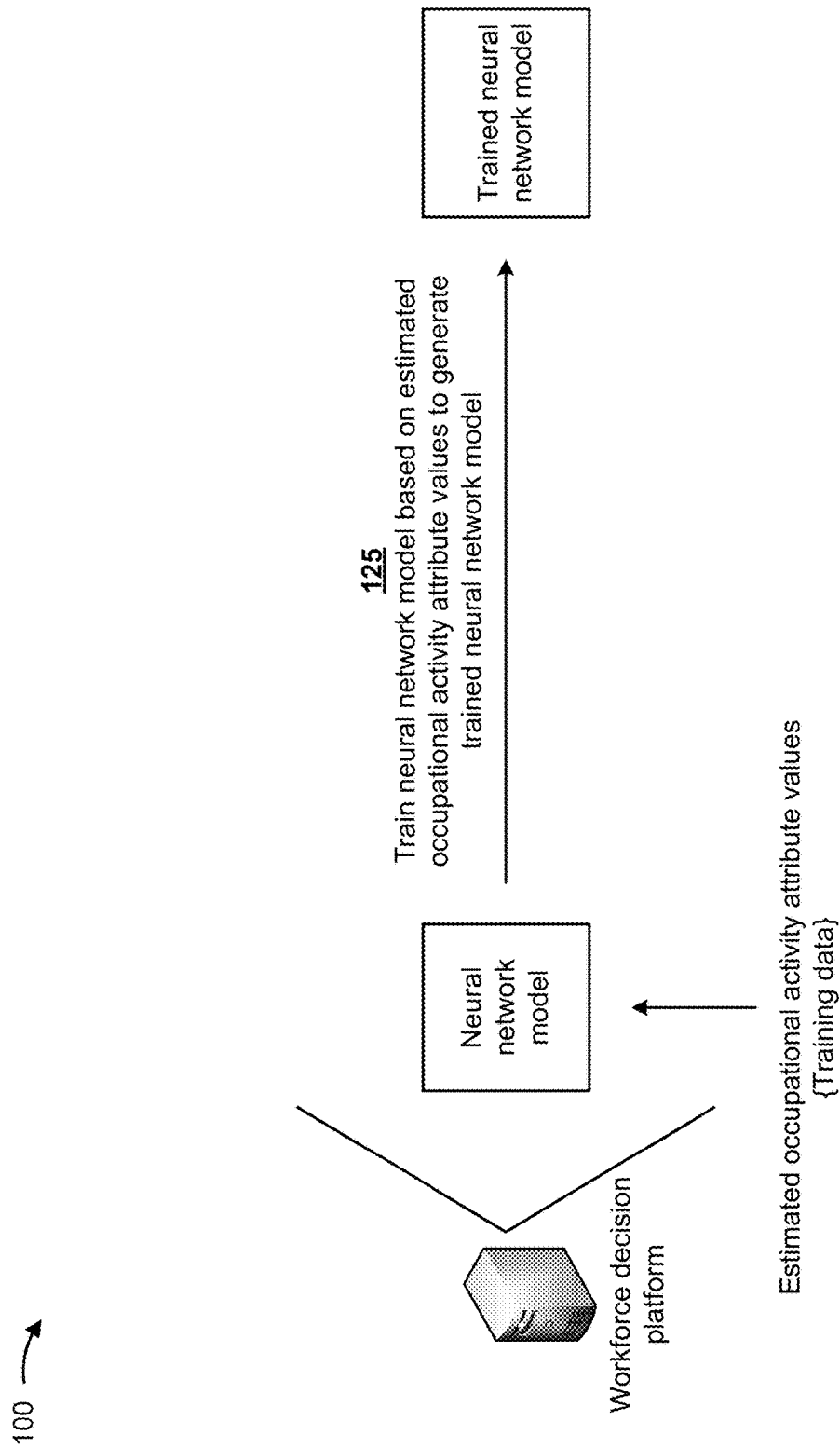

As shown in FIG. 1C, and by reference number 125, the workforce decision platform may train a neural network model based on the estimated occupational activity attribute values to generate a trained neural network model. In some implementations, the workforce decision platform may train the neural network model (e.g., to generate the trained neural network model) by providing the estimated occupational activity attribute vales (e.g., training data) to the neural network model, and receiving predictions based on providing the estimated occupational activity attribute vales to the neural network model. Based on the predictions, the workforce decision platform may update the neural network model, and may provide the estimated occupational activity attribute vales to the updated neural network model. The workforce decision platform may repeat this process until correct predictions are generated by the neural network model. In some implementations, the neural network model may include a deep neural network model, a multi-task learning deep neural network model, and/or the like, as described elsewhere herein.

Figure 1D:
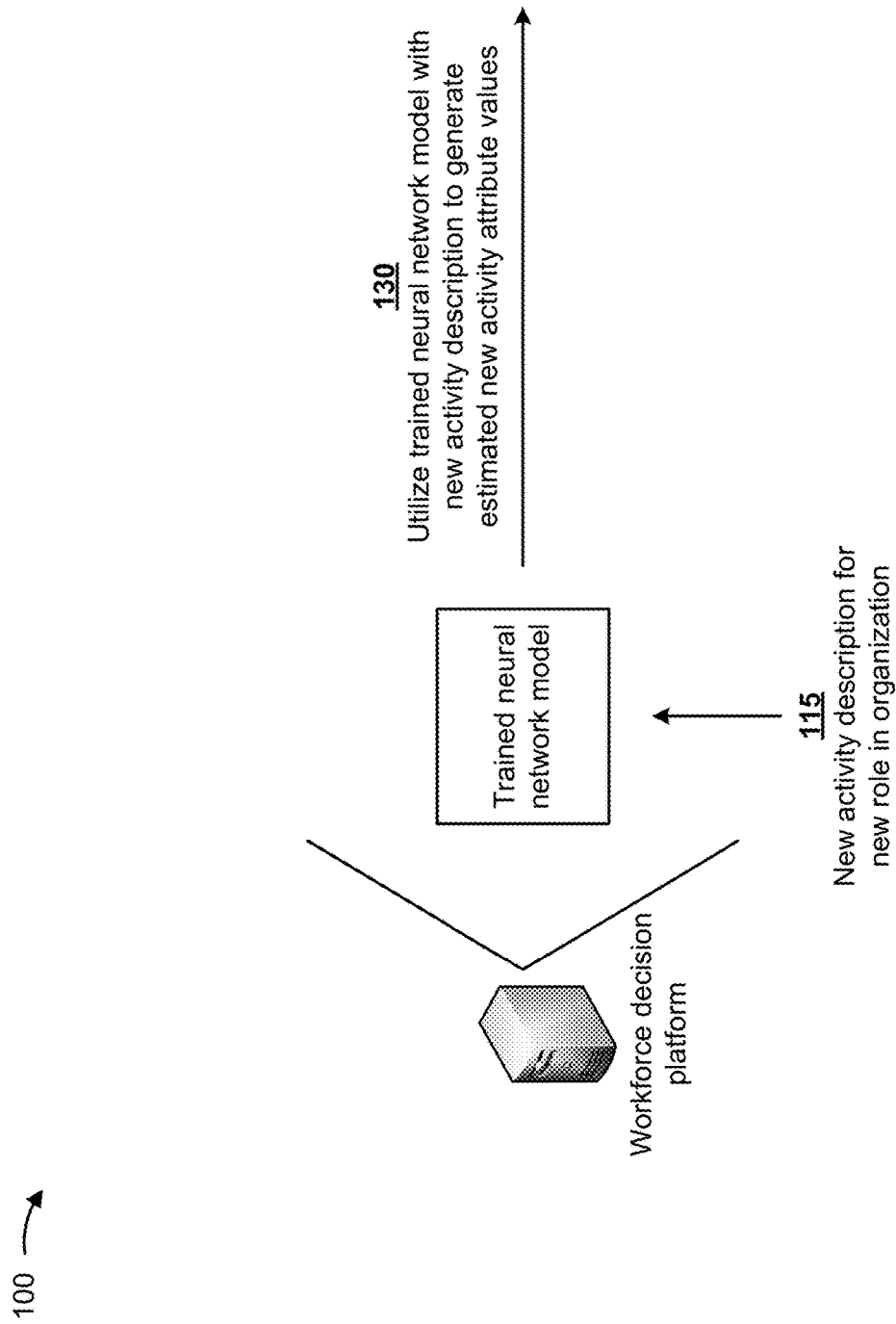

As shown in FIG. 1D, and by reference numbers 115 and 130, the workforce decision platform may utilize the trained neural network model with the new activity description for the new role in the organization to generate estimated new activity attribute values. In some implementations, the workforce decision platform may generate numeric vectors for the words in the new activity description, and may utilize the numeric vectors with the trained neural network model to generate the estimated new activity attribute values. Further details of how the workforce decision platform may utilize the trained neural network model with the new activity description for the new role in the organization to generate the estimated new activity attribute values are described below in connection with FIG. 1E.

Figure 1E:
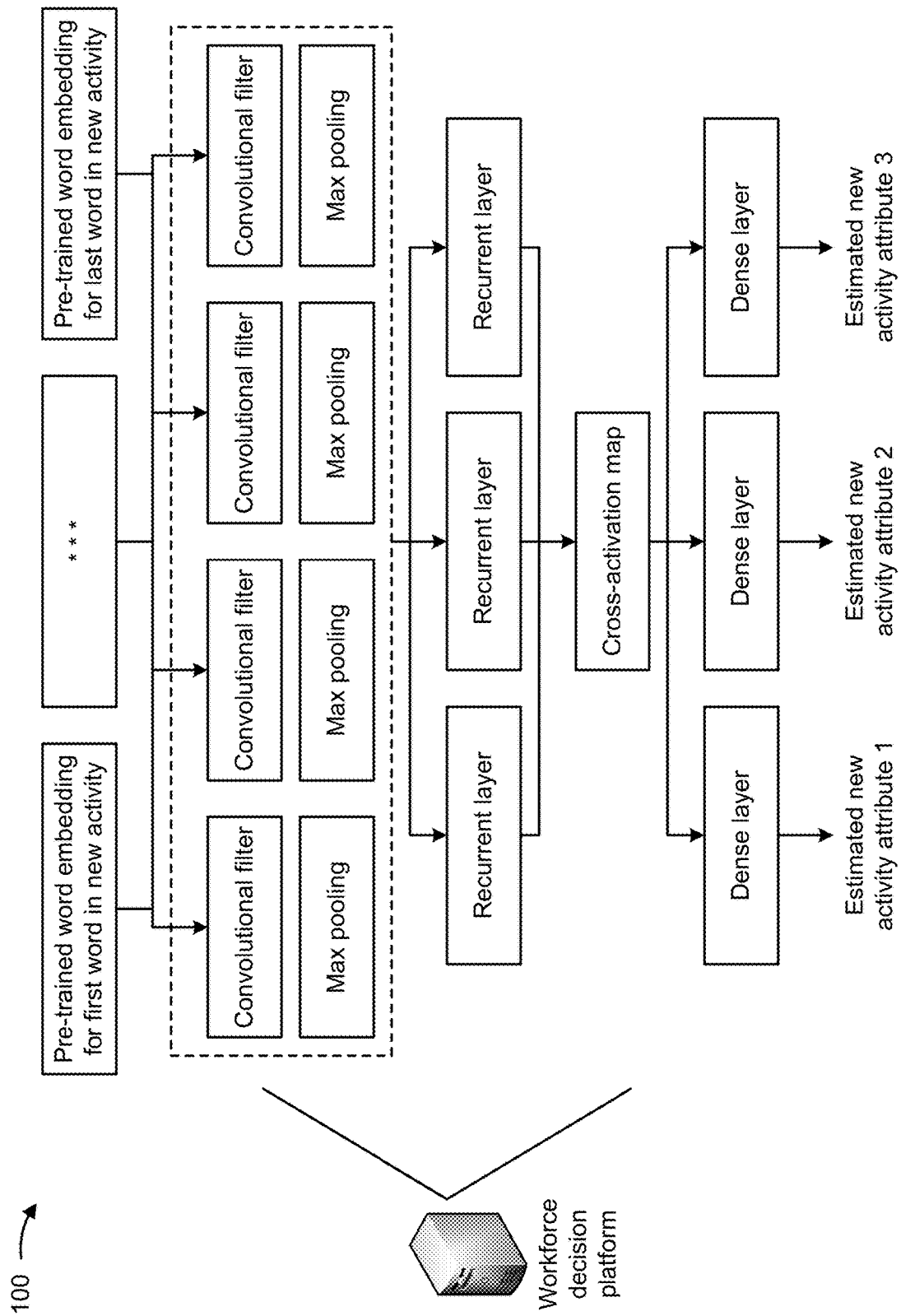

As shown in FIG. 1E, the workforce decision platform may utilize pre-trained word embeddings for the words in the new activity description for the new role in the organization (e.g., for the first word in the new activity description, the second word in the new activity description, etc.). In some implementations, an embedding may correspond to a relatively low-dimensional (e.g., size 50) representation of a word as a numeric vector, where words of similar meaning may be assigned similar numeric vectors. In some implementations, the workforce decision platform may utilize a resource (e.g., pre-trained embedding dictionaries for a variety of languages) to replace all of the words in the new activity description with corresponding numeric vectors (e.g., provided in the resource).

As further shown in FIG. 1E, the trained neural network model may include a single convolutional filter layer associated with a max pooling layer. In some implementations, the convolutional filter layer applies a convolution operation to an input, and passes a result of the convolution operation to a next layer. A convolution operation is an operation, performed on two functions (e.g., a first function and a second function), that produces a third function which is an integral and provides an amount of overlap of the first function as the first function is shifted over the second function. As shown in FIG. 1E, the convolutional filter layer may receive the pre-trained word embeddings, and may determine a fixed number (e.g., four shown in FIG. 1E) of patterns from the pre-trained word embeddings. In some implementations, each pattern may include the embedding vectors of a fixed number of adjacent words in the new activity description.

In some implementations, the max pooling layer may include a pooling layer that combines the outputs of neuron clusters at one layer into a single neuron in a next layer. A max pooling layer is a pooling layer that uses a maximum value from each cluster of neurons at a prior layer for a corresponding single neuron in a next layer. In some implementations, the max-pooling layer may determine a maximum overlap between a pattern (e.g., determined by the convolutional filter layer) and a set of adjacent words in the new activity description. Unlike the pre-trained word embeddings, which may be pre-trained independent of generating the estimated new activity attribute values, the convolutional filter layer may determine the patterns so that errors are reduced when the trained neural network generates the estimated new activity attribute values.

As further shown in FIG. 1E, the convolutional filter layer and the max pooling layer may provide the patterns and the maximum overlaps between patterns to recurrent layers of the trained neural network model. In some implementations, each recurrent layer may include a number of long short-term memory (LSTM) units, and the number of LSTM units in each recurrent layer may correspond to a number of the estimated new activity attribute values. In some implementations, a LSTM unit may include a building unit for a recurrent neural network environment. The LSTM unit may model a short-term memory that can last an extended period of time (e.g., sequence position). For example, a LSTM unit may include a cell, an input gate, an output gate, and a forget gate, such that the cell may remember values over arbitrary time intervals. The input gate, the output gate, and the forget gate may apply an activation function to regulate a flow of values through the LSTM unit.

In some implementations, the recurrent layers may process the patterns and the maximum overlaps between patterns (e.g., which represents the new activity description), and may determine an activation signal, of arbitrary dimensionality, that reflects a sequential evolution of the patterns. In some implementations, the workforce decision platform may train a single recurrent layer (e.g., and the LSTM units) for each new activity attribute value being estimated. In some implementations, the number of recurrent layers may be smaller than the number of the estimated new activity attribute values (e.g., to be determined) in order to reduce overfitting and determining shared patterns for estimated new activity attribute values that are highly similar (e.g., correlated). In some implementations, while the recurrent layers may be specific to a single outcome or a group of outcomes, the information learned in the recurrent layers may be made available for estimation of multiple outcomes (e.g., the estimated new activity attribute values).

As further shown in FIG. 1E, the recurrent layers may provide the determined activation signals to a cross-activation map layer. In some implementations, a cross-activation map layer (or a feature map layer) may provide output activations for a particular convolutional filter. In some implementations, the cross-activation map layer may enable subsequent layers (e.g., dense layers) of the trained neural network model to receive inputs that are weighted additive combinations of equivalent outputs from several of the recurrent layers. In such implementations, appropriate weights for the combination of values at the same vector position but from different input vectors may be determined during training of the trained neural network model. In some implementations, the workforce decision platform may impose constraints on the cross-activation map layer so that most weights in the cross-activation map layer may remain small, but outcomes that are highly correlated may incorporate information from the recurrent layers with other correlated outcomes. In such implementations, this may enable the workforce decision platform to incorporate knowledge about attribute correlations into the trained neural network model.

As further shown in FIG. 1E, the cross-activation map layer may provide the weighted additive combinations of the determined activation signals (e.g., provided by the recurrent layers) to dense layers. In some implementations, the dense layers (e.g., also known as fully-connected layers) may perform classification of the weighted additive combinations of the determined activation signals, and may determine the estimated new activity attribute values based on the classification. In some implementations, each dense layer may connect the weighted additive combinations of the determined activation signals in order to generate the estimated new activity attribute values. In some implementations, a number of dense layers may correspond to the number of the estimated new activity attribute values.

Figure 1F:
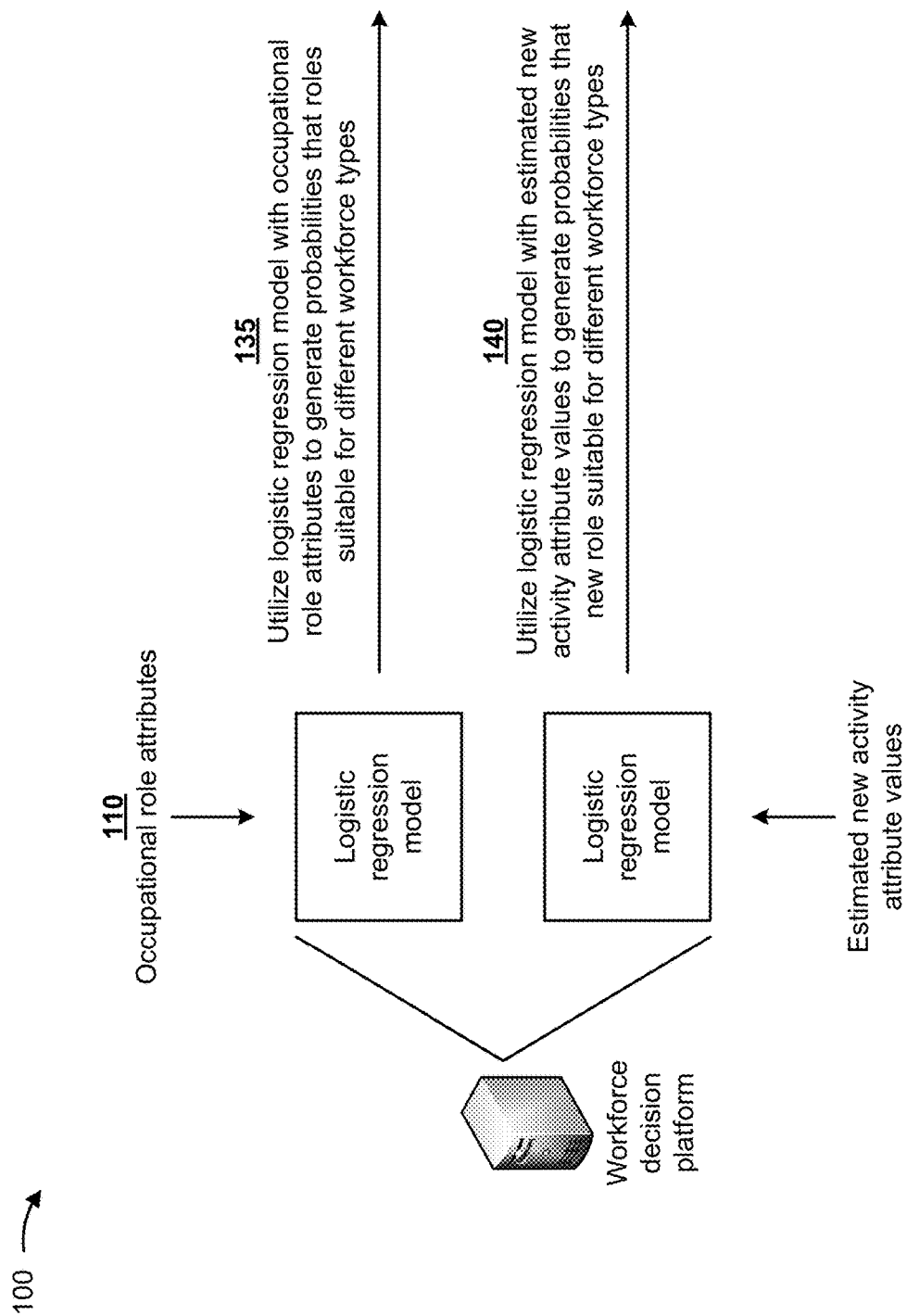

As shown in FIG. 1F, and by reference numbers 110 and 135, the workforce decision platform may utilize a logistic regression model with the occupational role attributes (e.g., the occupational role attribute values) to generate probabilities that roles (e.g., associated with the occupational role attributes) are suitable for different workforce types (e.g., full-time employees, part-time employees, contract employees, hoteling employees, and/or the like). In some implementations, the logistic regression model may include a binary logistic regression model, a multiclass logistic regression model, a regularized logistic regression model, and/or the like, as described elsewhere herein. Further details of the logistic regression model are described below in connection with FIG. 1G.

As further shown in FIG. 1F, and by reference number 140, the workforce decision platform may utilize a logistic regression model with the estimated new activity attribute values to generate probabilities that the new role is suitable for different workforce types (e.g., full-time employee, part-time employee, contract employee, hoteling employee, and/or the like). In some implementations, the logistic regression model may include a binary logistic regression model, a multiclass logistic regression model, a regularized logistic regression model, and/or the like, as described elsewhere herein. Further details of the logistic regression model are described below in connection with FIG. 1G.

Figure 1G:
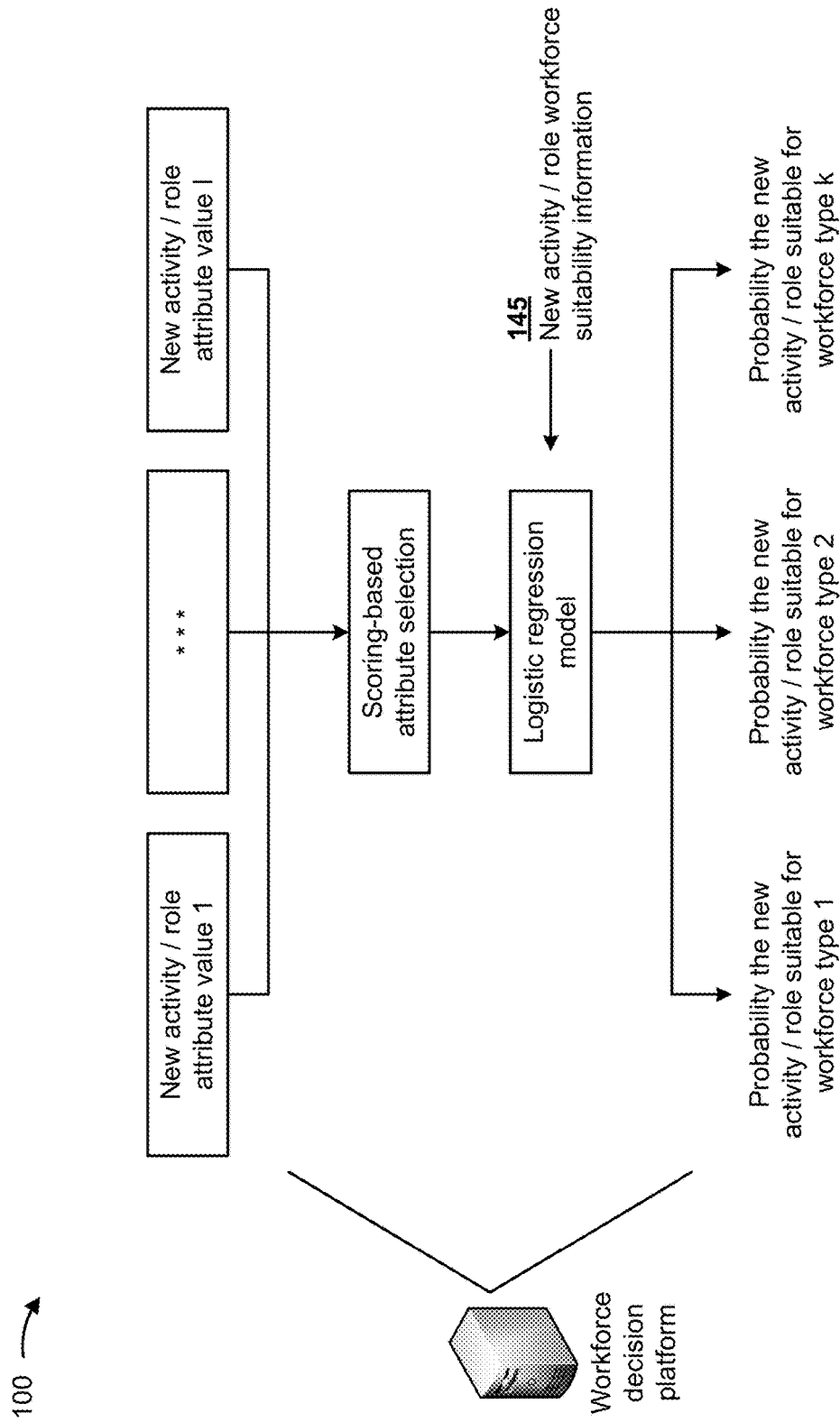

For ease of reference, FIG. 1G combines the processing of the occupational role attributes and the estimated new activity attribute values, with the logistic regression model, to generate the probabilities that the roles are suitable for the different workforce types and the probabilities that the new role is suitable for the different workforce types, respectively. In some implementations, the logistic regression model may be used separately with the occupational role attributes and the estimated new activity attribute values, and may separately generate the probabilities that the roles are suitable for the different workforce types and the probabilities that the new role is suitable for the different workforce types.

As shown in FIG. 1G, the workforce decision platform may provide the estimated new activity attribute values and the occupational role attributes (e.g., the occupation role attribute values), hereinafter referred to collectively as new activity/role attribute values, to a scoring-based attribute selection mechanism. In some implementations, the scoring-based attribute selection mechanism may score the new activity/role attribute values to identify the new activity/role attribute values with the same values (e.g., which may not be useful for calculating the probabilities). In such implementations, the workforce decision platform may remove the new activity/role attribute values with the same values, and, thus, reduce the total number of new activity/role attribute values (e.g., so that only new activity/role attribute values remain that are useful for calculating the probabilities).

In some implementations, the scoring-based attribute selection mechanism may include a variance mechanism, a feature score mechanism, a Laplace score mechanism, an F-score mechanism, a mutual information mechanism, a random selection mechanism, and/or the like.

In some implementations, the variance mechanism may include a scoring-based attribute selection mechanism that applies a variance function to the new activity/role attribute values. A variance function may measure how far a set of numbers (e.g., random numbers) are spread out from an average value of the set of numbers. For example, the variance may be measured as an expectation of a squared deviation of a random variable from a mean of the random variable.

In some implementations, the feature scoring mechanism may include a scoring-based attribute selection mechanism that applies spectral scoring to the new activity/role attribute values. Spectral scoring relates to a result about when a linear operator or matrix can be diagonalized (e.g., represented as a diagonal matrix). For example, the spectral theorem may identify a class of linear operators that can be modeled by multiplication operators.

In some implementations, the Laplace score mechanism may include a scoring-based attribute selection mechanism that applies a Laplace distribution to the new activity/role attribute values. A Laplace distribution is a type of continuous probability distribution. Also called a double exponential distribution, the Laplace distribution is a distribution of differences between two independent variates with identical exponential distributions.

In some implementations, the F-score mechanism may include a scoring-based attribute selection mechanism that applies an F-score to the new activity/role attribute values. As F-score is a measure of an accuracy of a test that considers both a precision and a recall of the test, where the precision is a number of correct positive results divided by a number of all positive results returned by a classifier, and where a recall is the number of correct positive results divided by a number of all relevant samples (e.g., all samples that should have been identified as positive). For example, the F-score may be calculated as a harmonic average of the precision and the recall.

In some implementations, the mutual information mechanism may include a scoring-based attribute selection mechanism that applies a mutual information function to the new activity/role attribute values. A mutual information function may measure a mutual dependence between two random variables. For example, the mutual information function may quantify an amount of information obtained about one random variable, through another random variable.

In some implementations, the random selection mechanism may include a scoring-based attribute selection mechanism that applies a random selection method to the new activity/role attribute values. A random selection method may employ, for example, a form of random sampling. Random sampling relies on the laws of probability to select, from a set of values, a subset of the set of values (i.e., a sample) that can be expected to reasonably represent a larger set of values. For example, the random selection mechanism may apply simple random sampling, equal probability systematic sampling, and/or the like.

As further shown in FIG. 1G, the scoring-based attribute selection mechanism may provide the selected (e.g., the reduced number of) new activity/role attribute values to the logistic regression model, as described elsewhere herein. As further shown in FIG. 1G, and by reference number 145, the logistic regression model may also receive new activity/role workforce suitability information. In some implementations, the workforce decision platform may receive the new activity/role workforce suitability information from one or more resources separate from the workforce decision platform (e.g., from experts in the occupational field). In some implementations, the new activity/role workforce suitability information may include information indicating expert judgments on the suitability of particular occupational roles for various workforce types.

As further shown in FIG. 1G, the workforce decision platform may process the selected new activity/role attribute values and the new activity/role workforce suitability information, with the logistic regression model, to generate probabilities that the new activity/role is suitable for workforce type 1, workforce type 2, . . . workforce type k (k≥1) (e.g., the probabilities that the roles are suitable for the different workforce types and the probabilities that the new role is suitable for the different workforce types).

Figure 1H:
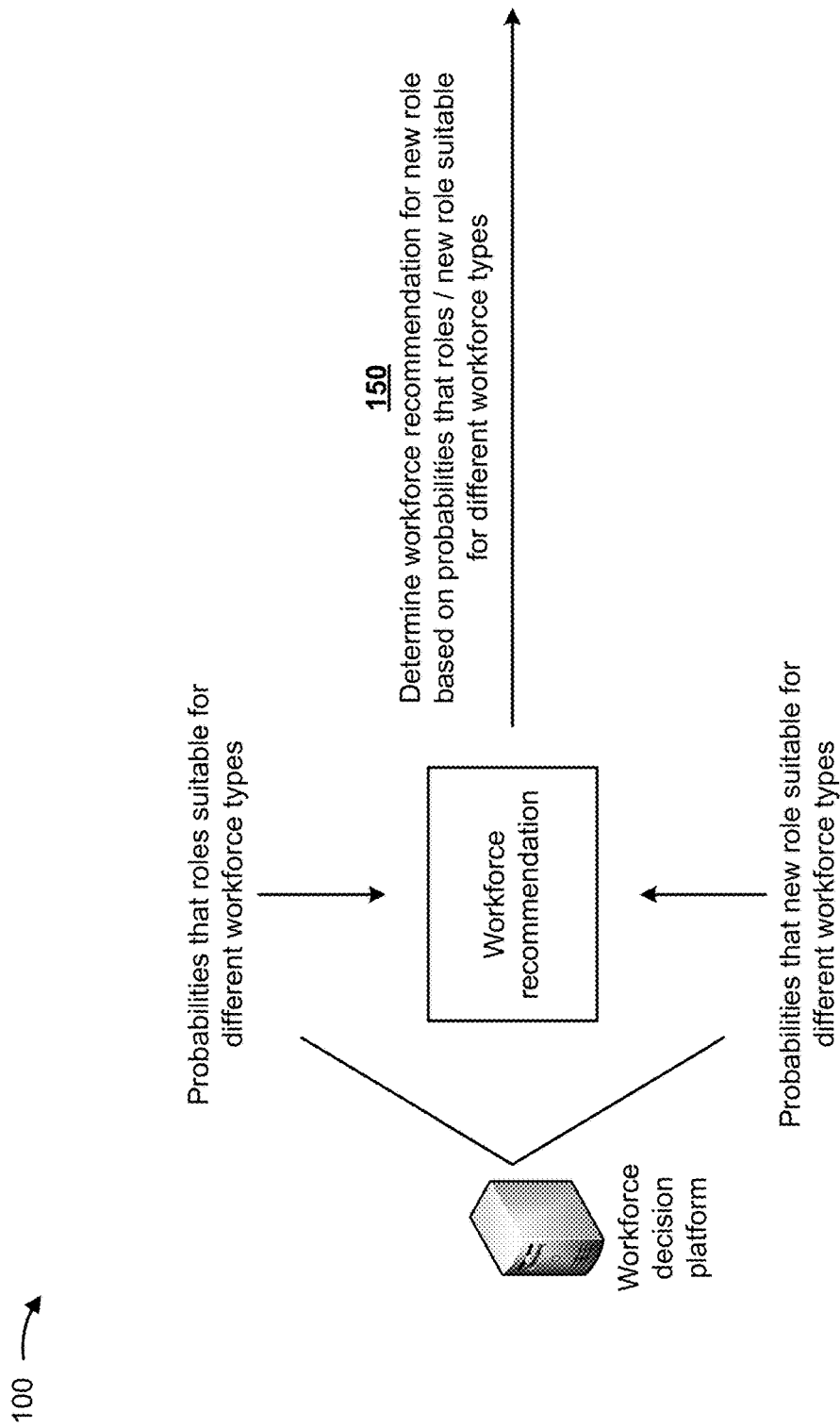

As shown in FIG. 1H, and by reference number 150, the workforce decision platform may determine a workforce recommendation for the new role based on the probabilities that the roles are suitable for the different workforce types and the probabilities that the new role (e.g., the new activity) is suitable for the different workforce types. In some implementations, the workforce decision platform may determine that the new role is suitable for a particular workforce type (e.g., a full-time employee) when the probabilities indicate that the roles and the new role are suitable for the particular workforce type.

In some implementations, the workforce decision platform may automatically generate a job posting for the new role, may automatically post the job posting (e.g., to a website, to a newspaper, to a trade magazine, etc.), may automatically identify a current employee who may fulfill the new role, may automatically select a team (e.g., of one or more employees) for the new role based on employee profiles, prior jobs of the employees, employee education backgrounds, employee past performance review data, etc., may automatically contact a recruiter with job requirements for the new role, may automatically generate a job requirements document for the new role, and/or the like.

Figure 1I:
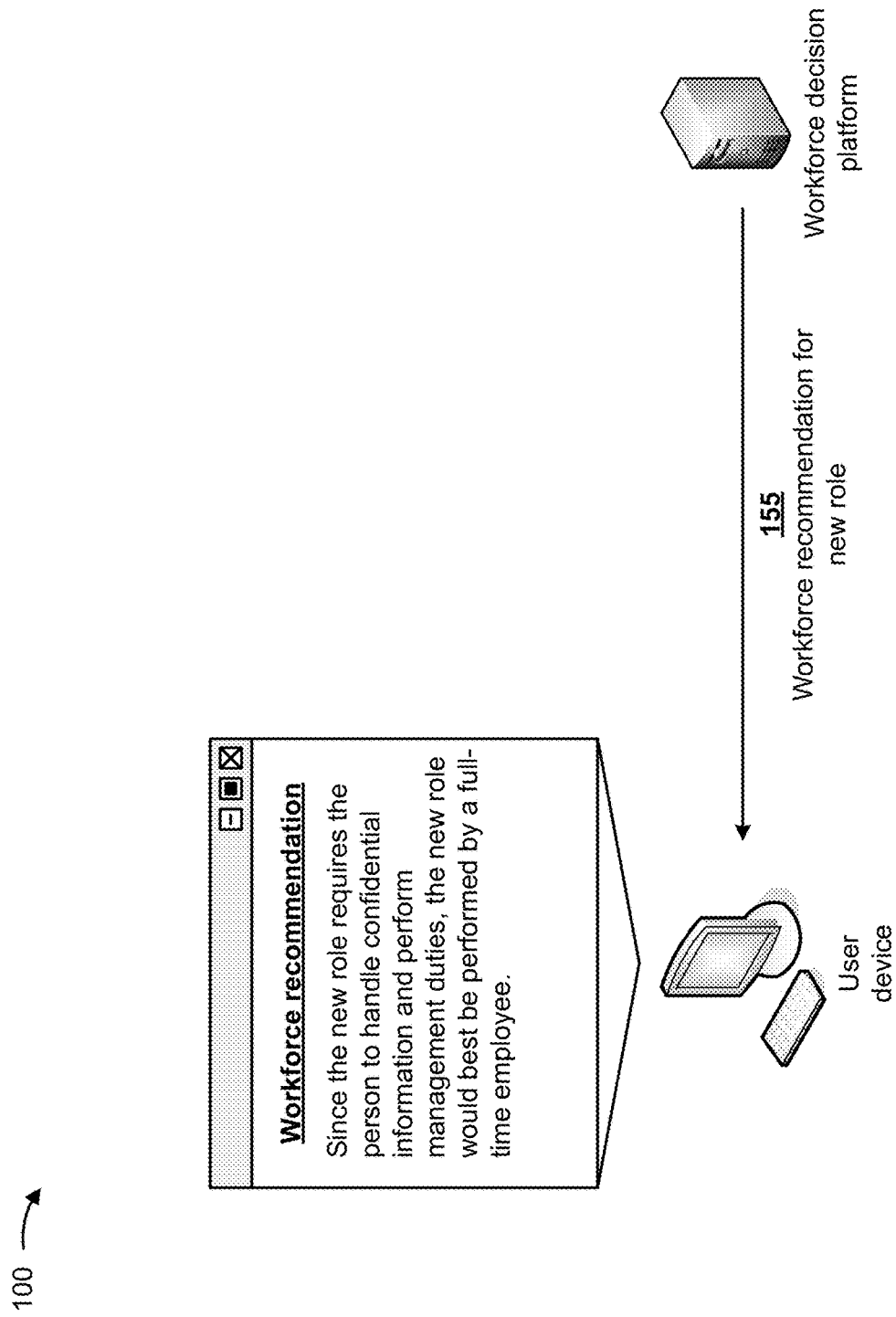

As shown in FIG. 1I, and by reference number 155, the workforce decision platform may provide, to the user device, information indicating the workforce recommendation for the new role. The user device may display the information indicating the workforce recommendations for the new role (e.g., via a user interface). For example, the user interface may indicate that "since the new role requires the person to handle confidential information and perform management duties, the new role would best be performed by a full-time employee."

In this way, several different stages of the process for determining optimal workforce types to fulfill occupational roles in an organization based on occupational attributes are automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. These roles may include consulting occupational databases, which may provide little or guidance for making workforce type determinations, and/or the like. Finally, automating the process for determining optimal workforce types to fulfill occupational roles in an organization based on occupational attributes conserves computing resources (e.g., processor resources, memory resources, and/or the like) that would otherwise be wasted in attempting to determine optimal workforce types.

In some implementations, the workforce decision platform may process a large scope of data (e.g., big data), such as millions, billions, or trillions of data items, for one or more organizations, on a daily basis.

As indicated above, FIGS. 1A-1I are provided merely as examples. Other examples are possible and may differ from what was described with regard to FIGS. 1A-1I.

Figure 2:
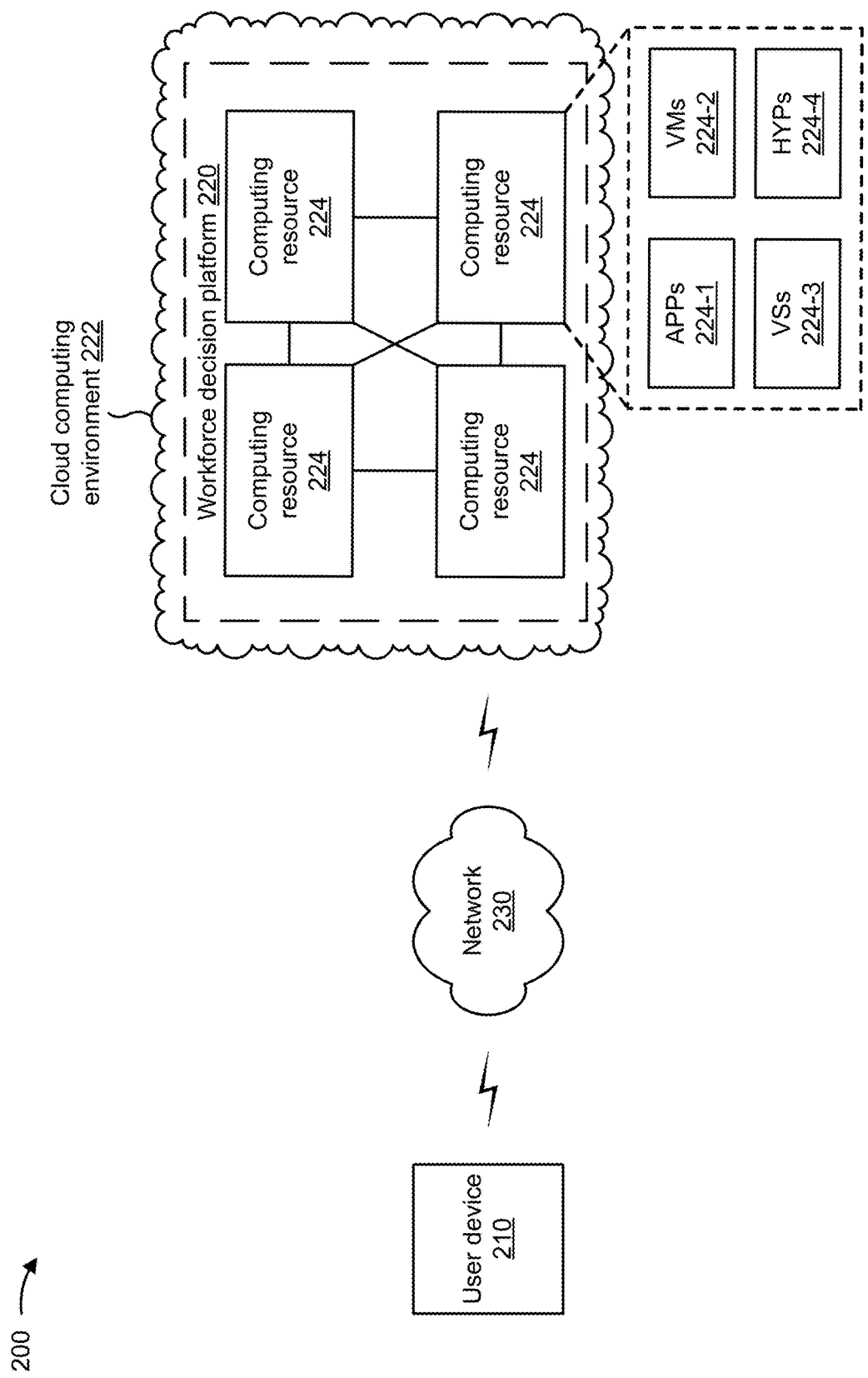
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a workforce decision platform 220, and a network 230. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to workforce decision platform 220.

Workforce decision platform 220 includes one or more devices that determines optimal workforce types to fulfill occupational roles in an organization based on occupational attributes. In some implementations, workforce decision platform 220 may be designed to be modular such that certain software components may be swapped in or out depending on a particular need. As such, workforce decision platform 220 may be easily and/or quickly reconfigured for different uses. In some implementations, workforce decision platform 220 may receive information from and/or transmit information to one or more user devices 210.

In some implementations, as shown, workforce decision platform 220 may be hosted in a cloud computing environment 222. Notably, while implementations described herein describe workforce decision platform 220 as being hosted in cloud computing environment 222, in some implementations, workforce decision platform 220 may not be cloud-based (i.e., may be implemented outside of a cloud computing environment) or may be partially cloud-based.

Cloud computing environment 222 includes an environment that hosts workforce decision platform 220. Cloud computing environment 222 may provide computation, software, data access, storage, etc. services that do not require end-user knowledge of a physical location and configuration of system(s) and/or device(s) that hosts workforce decision platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host workforce decision platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with workforce decision platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210 or an operator of workforce decision platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
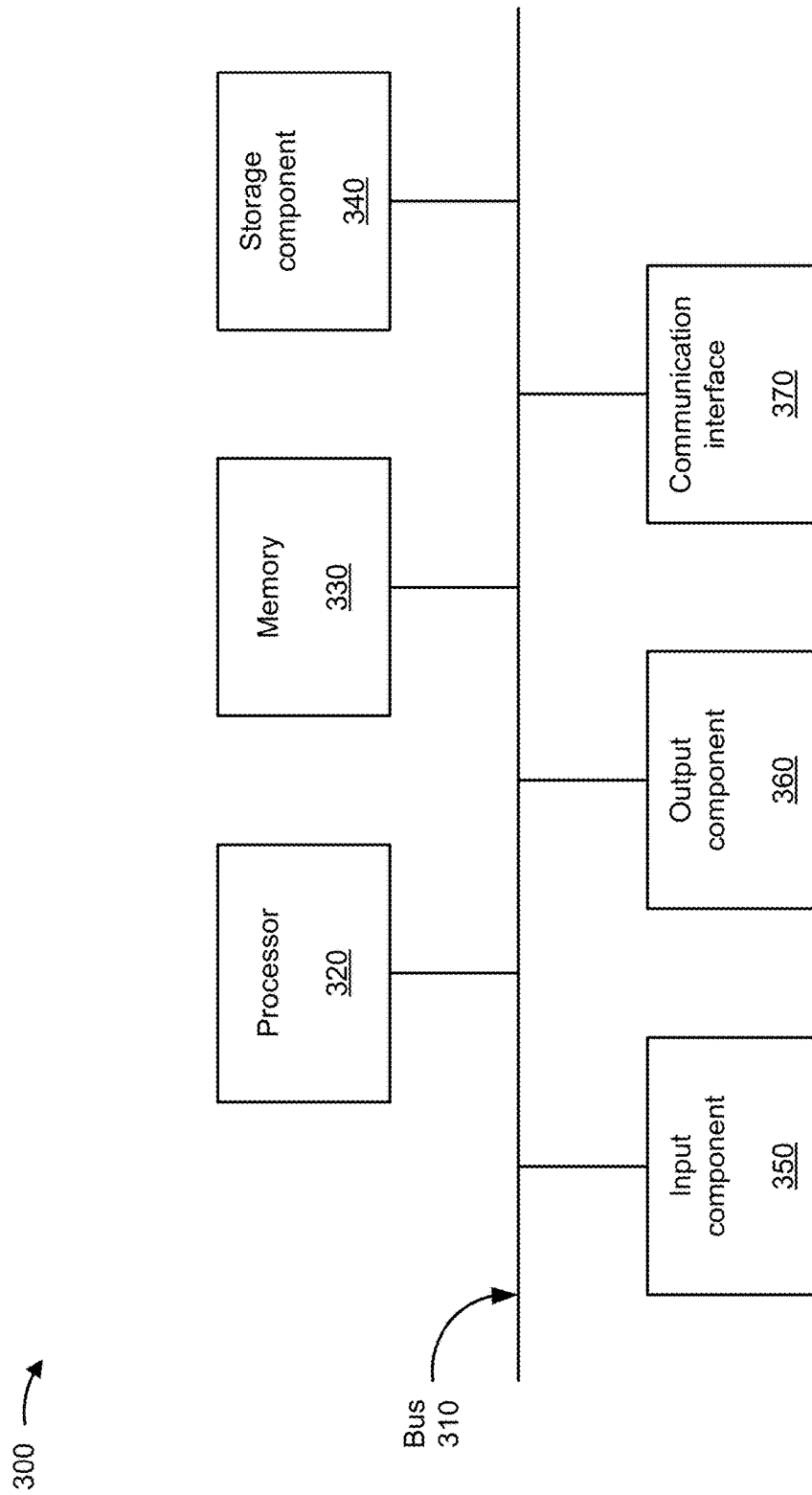
FIG. 3 is a diagram of example components of one or more devices of FIG. 2.

FIG. 3 is a diagram of example components of a device 300. Device 300 may correspond to user device 210, workforce decision platform 220, and/or computing resource 224. In some implementations, user device 210, workforce decision platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
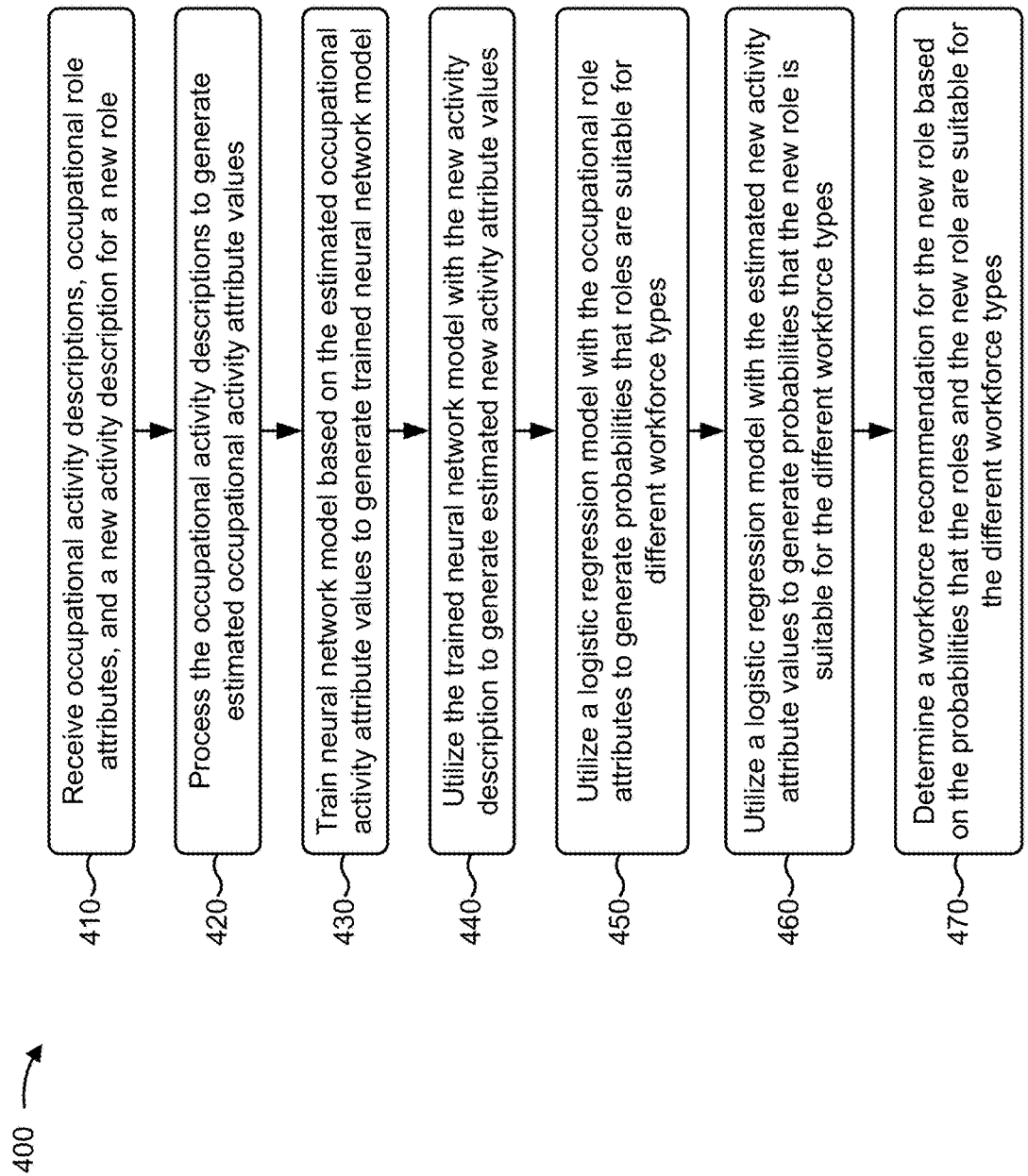
FIG. 4 is a flow chart of an example process for determining optimal workforce types to fulfill occupational roles in an organization based on occupational attributes.

FIG. 4 is a flow chart of an example process 400 for determining optimal workforce types to fulfill occupational roles in an organization based on occupational attributes. In some implementations, one or more process blocks of FIG. 4 may be performed by workforce decision platform 220. In some implementations, one or more process blocks of FIG. 4 may be performed by another device or a group of devices separate from or including workforce decision platform 220, such as user device 210.

As shown in FIG. 4, process 400 may include receiving occupational activity descriptions, occupational role attributes, and a new activity description for a new role in an organization (block 410). For example, workforce decision platform 220 (e.g., using computing resource 224, processor 320, communication interface 370, and/or the like) may receive occupational activity descriptions, occupational role attributes, and a new activity description for a new role in an organization. In some implementations, workforce decision platform 220 may receive the occupational activity descriptions from one or more resources, such as occupational databases (e.g., the O*NET database, the WISCO, and/or the like). In some implementations, the occupational activity descriptions may include information identifying activities associated with different occupations (e.g., speaking in public, operating machinery, handling confidential information, performing accounting tasks, managing factory workers, information input, mental processes, interacting with others, and/or the like).

In some implementations, workforce decision platform 220 may receive the occupational role attributes from one or more resources, such as the occupational databases described above. In some implementations, the occupational role attributes may include information identifying attributes of different roles associated with occupations (e.g., cognitive abilities, physical abilities, interests, knowledge in different fields, basic skills, social skills, technical skills, work context, work styles, and/or the like). In some implementations, the occupational activity descriptions and/or the occupational role attributes may be utilized by workforce decision platform 220 to train models (e.g., a neural network model, a logistic regression model, and/or the like), as described elsewhere herein.

In some implementations, a user of user device 210 (e.g., via a user interface provided to the user) may cause user device 210 to provide, to workforce decision platform 220, the new activity description for the new role in the organization. In some implementations, the activity description for the new role may include information identifying activities associated with a performing the new role in the organization (e.g., speaking in public, meeting customers, providing legal advice, information input, mental processes, interacting with others, and/or the like).

In some implementations, user device 210 may cause the occupational activity descriptions and/or the occupational role attributes to be provided from the one or more resources, storing the occupational activity descriptions and/or the occupational role attributes, to workforce decision platform 220. In some implementations, workforce decision platform 220 may receive the occupational activity descriptions, the occupational role attributes, and/or the new activity description, and may store the occupational activity descriptions, the occupational role attributes, and/or the new activity description in a memory (e.g., in one or more data structures) associated with workforce decision platform 220.

In this way, workforce decision platform 220 may receive the occupational activity descriptions, the occupational role attributes, and the new activity description for the new role in the organization.

As further shown in FIG. 4, process 400 may include processing the occupational activity descriptions to generate estimated occupational activity attribute values (block 420). For example, workforce decision platform 220 (e.g., using computing resource 224, processor 320, and/or the like) may process the occupational activity descriptions to generate estimated occupational activity attribute values.

In some implementations, the occupational activity descriptions may be associated with attributes of different occupational roles (e.g., occupational activity attributes), and the occupational activity attributes may be associated with attribute values (e.g., occupational attribute values). For example, each occupational activity attribute in the O*NET database (e.g., also referred to as a descriptor) is associated with a scale, such as importance, level, and extent of the occupational activity, and each of these scales covers a different numerical range. In order to simplify interpretation, the scales are standardized to a particular scale range (e.g., from zero to one hundred, from zero to one thousand, and/or the like).

Estimation of various occupational activity attribute values from short occupational activity descriptions is difficult since true occupational activity attribute values for any set of occupational activity descriptions may be unknown. In some implementations, workforce decision platform 220 may overcome this complication by assuming that the most important activities of a role (e.g., as indicated by activity importance values provided in the O*NET database) shares an attribute profile of a parent role (e.g., within the O*NET database, activities may belong to a role, and attributes of the role may be known). In some implementations, workforce decision platform 220 may apply non-linear scaling to the occupational attribute values in order to generate interim occupational activity attribute values. For example, workforce decision platform 220 may apply the non-linear scaling to attributes of the parent role, such that small attribute values may be reduced and large attribute values may be increased. In some implementations, the non-linear scaling may include applying a scaling function (e.g., $f(x)=1/1+e^{-(x-0.5)}$) to the occupational attribute values, where x may correspond to the occupational attribute values, and $f(x)$ may correspond to the scaled results.

In some implementations, each occupational attribute value may be associated with a quantity of tasks for a corresponding occupational role. The attribute profile of the parent role may provide a characterization of the most important tasks for a role that is effectively diluted by other, less important tasks for the role. In some implementations, to counteract this dilution, workforce decision platform 220 may amplify the parent role attribute profile in order to reduce the small attribute values and to increase the large attribute values. In some implementations, workforce decision platform 220 may introduce noise to the scaled occupational activity attribute values in order to generate the estimated occupational activity attribute values. For example, workforce decision platform 220 may introduce the noise to the scaled occupational activity attribute values in order to avoid pairing all of the most important tasks with the same occupational attribute values. This may prevent determination of false equivalences between the most important tasks associated with the same occupational attribute value.

In some implementations, the estimated occupational activity attribute values may be utilized as training data for one or more models (e.g., a neural network model) utilized by workforce decision platform 220, as described elsewhere herein.

In this way, workforce decision platform 220 may process the occupational activity descriptions to generate the estimated occupational activity attribute values.

As further shown in FIG. 4, process 400 may include training a neural network model based on the estimated occupational activity attribute values to generate a trained neural network model (block 430). For example, workforce decision platform 220 (e.g., using computing resource 224, processor 320, and/or the like) may train a neural network model based on the estimated occupational activity attribute values to generate a trained neural network model. In some implementations, workforce decision platform 220 may train the neural network model (e.g., to generate the trained neural network model) by providing the estimated occupational activity attribute vales (e.g., training data) to the neural network model, and receiving predictions based on providing the estimated occupational activity attribute vales to the neural network model. Based on the predictions, workforce decision platform 220 may update the neural network model, and may provide the estimated occupational activity attribute vales to the updated neural network model. Workforce decision platform 220 may repeat this process until correct predictions are generated by the neural network model.

In some implementations, the neural network model may include a deep neural network model, a multi-task learning deep neural network model, and/or the like. Further details of the neural network model and the trained neural network model are described above in connection with FIG. 1E.

In some implementations, a deep neural network model may include an artificial neural network with multiple hidden layers between an input layer and an output layer. A deep neural network model may model complex non-linear relationships. A deep neural network model may generate compositional models where an object is expressed as a layered composition of primitives. The extra layers enable composition of features from lower layers, potentially modeling complex data with fewer units than a similarly performing shallow network. A deep neural network model may include a feedforward network in which data flows from the input layer to the output layer without looping back. In some implementations, the deep neural network model may include a convolutional deep neural network model.

In some implementations, a multi-task learning deep neural network model may include a deep neural network model that utilizes multi-task learning. Multi-task learning includes sharing representations between related tasks, which enables a model to better generalize an original task. Multi-task learning may be performed with either hard or soft parameter sharing of hidden layers. Hard parameter sharing includes sharing hidden layers between all tasks, while keeping several task-specific output layers. In soft parameter sharing, on the other hand, each task has a corresponding model with corresponding parameters.

In this way, workforce decision platform 220 may train the neural network model based on the estimated occupational activity attribute values to generate the trained neural network model.

As further shown in FIG. 4, process 400 may include utilizing the trained neural network model with the new activity description to generate estimated new activity attribute values (block 440). For example, workforce decision platform 220 (e.g., using computing resource 224, processor 320, and/or the like) may utilize the trained neural network model with the new activity description to generate estimated new activity attribute values. In some implementations, workforce decision platform 220 may utilize the trained neural network model with the new activity description to generate estimated new activity attribute values, as described above in connection with FIG. 1E.

In this way, workforce decision platform 220 may utilize the trained neural network model with the new activity description to generate the estimated new activity attribute values.

As further shown in FIG. 4, process 400 may include utilizing a logistic regression model with the occupational role attributes to generate probabilities that roles are suitable for different workforce types (block 450). For example, workforce decision platform 220 (e.g., using computing resource 224, processor 320, and/or the like) may utilize a logistic regression model with the occupational role attributes to generate probabilities that roles are suitable for different workforce types. In some implementations, the roles may be associated with the occupational role attributes, and may be provided by the O*NET database. In some implementations, the probabilities that the roles are suitable for the different workforce types may provide an indication of which roles are more suitable for different workforce types. For example, the probabilities may indicate that a role of a manager may best be served by a full-time employee, a role of a factory worker may best be served by a contractor, and/or the like.

Further details of the logistic regression model are described above in connection with FIG. 1G. In some implementations, the logistic regression model may include a binary logistic regression model, a multiclass logistic regression model, a regularized logistic regression model, and/or the like, that assign observations to a discrete set of classes. In some implementations, the binary logistic regression model may include a logistic regression model that assigns observations to a discrete set of classes based on a binary criteria (e.g., a pass or fail criteria). In some implementations, the multiclass logistic regression model may include the binary logistic regression model where the criteria is expanded to more than two, and where the binary logistic regression model is executed multiple times, once for each of the classes. In some implementations, the regularized logistic regression model may include applying regularization methods (e.g., a Ridge method, a Lasso method, an ElasticNet method, and/or the like) to a logistic regression model that assigns observations to a discrete set of classes.

In this way, workforce decision platform 220 may utilize the logistic regression model with the occupational role attributes to generate the probabilities that the roles are suitable for the different workforce types.

As further shown in FIG. 4, process 400 may include utilizing a logistic regression model with the estimated new activity attribute values to generate probabilities that the new role is suitable for the different workforce types (block 460). For example, workforce decision platform 220 (e.g., using computing resource 224, processor 320, and/or the like) may utilize a logistic regression model with the estimated new activity attribute values to generate probabilities that the new role is suitable for the different workforce types. In some implementations, the probabilities that the new role is suitable for the different workforce types may provide an indication of which different workforce types are most suitable for the role. For example, the probabilities may indicate that full-time employment is best for new role since the new role will involve maintaining confidential organization information, that contract employment is best for the new role since the role will not be a full-time position, and/or the like.

Further details of the logistic regression model are described above in connection with FIG. 1G. In some implementations, the logistic regression model may include a binary logistic regression model, a multiclass logistic regression model, a regularized logistic regression model, and/or the like, as described elsewhere herein. In some implementations, workforce decision platform 220 may utilize the same or different logistic regression models when generating the probabilities that the roles are suitable for the different workforce type and the probabilities that the new role is suitable for the different workforce types.

In this way, workforce decision platform 220 may utilize the logistic regression model with the estimated new activity attribute values to generate the probabilities that the new role is suitable for the different workforce types.

As further shown in FIG. 4, process 400 may include determining a workforce recommendation for the new role based on the probabilities that the roles and the new role are suitable for the different workforce types (block 470). For example, workforce decision platform 220 (e.g., using computing resource 224, processor 320, and/or the like) may determine a workforce recommendation for the new role based on the probabilities that the roles and the new role are suitable for the different workforce types. In some implementations, workforce decision platform 220 may determine that the new role is suitable for a particular workforce type (e.g., a full-time employee) when the probabilities indicate that the roles and the new role are suitable for the particular workforce type. In some implementations, workforce decision platform 220 may recommend a workforce type with a highest probability as compared to probabilities for other workforce types.

In some implementations, workforce decision platform 220 may calculate a threshold based on the probabilities that the new role is suitable for the different workforce types, and may compare the probabilities that the roles are suitable for the different workforce types to the threshold. For particular roles that satisfy the threshold, workforce decision platform 220 may calculate financial benefits associated with the particular roles, and may recommend one or more of workforce types (e.g., the workforce recommendation) for the new role based on the financial benefits.

In some implementations, workforce decision platform 220 may provide the workforce recommendation for the new role to one or more devices associated with users that are interested in the workforce recommendation for the new role (e.g., human resources personnel). For example, workforce platform 220 may provide, to user device 210, information indicating the workforce recommendation for the new role. User device 210 may display the information indicating the workforce recommendations for the new role (e.g., via a user interface) to the user.

In this way, workforce decision platform 220 may determine the workforce recommendation for the new role based on the probabilities that the roles and the new role are suitable for the different workforce types.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein provide a workforce decision platform that determines optimal workforce types to fulfill occupational roles and activities in an organization based on occupational attributes. For example, the workforce decision platform may receive occupational activity descriptions, occupational roles, activities associated with one or more roles, occupational role attributes, and a new activity description for a new role in an organization. The workforce decision platform may process the occupational activity descriptions to generate estimated occupational activity attribute values, and may train a neural network model based on the estimated occupational activity attribute values to generate a trained neural network model. The workforce decision platform may utilize the trained neural network model with the new activity description to generate estimated new activity attribute values, and may utilize a linear classification model (e.g., a logistic regression model) with the occupational role attributes to generate probabilities that roles are suitable for different workforce types. The workforce decision platform may utilize a logistic regression model with the estimated new activity attribute values to generate probabilities that the new role is suitable for the different workforce types. The workforce decision platform may determine a workforce recommendation for the new role or activity based on the probabilities that the roles and the new role are suitable for the different workforce types.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    one or more memories; and
    one or more processors, communicatively coupled to the one or more memories, to:
        receive occupational activity descriptions and occupational role attributes,
            wherein the occupational activity descriptions include information identifying activities associated with different occupations, and
            wherein the occupational role attributes include information identifying attributes of different roles associated with the different occupations;
        process the occupational activity descriptions to generate estimated occupational activity attribute values for the occupational role attributes by converting one or more words in one or more of the occupational activity descriptions into one or more vectors using at least one of:
            a convolution layer,
            weights for the vectors, determined using an activation map, or
            sequences of the vectors, determined using a plurality of long short term memory modules,
            wherein the estimated occupational activity attribute values indicate, for an occupational role attribute of the occupational role attributes, a measure of importance of the occupational role attribute to the different occupations, and
            wherein the one or more processors, when processing the occupational activity descriptions, are to:
                perform scaling and noising techniques on the occupational role attributes to generate amended role attribute values; and
                determine a result of comparing the estimated occupational activity attribute values and the amended role attribute values,
                    where the result of the comparing is used as training data for training a neural network model;
        train the neural network model based on the result of the comparing to generate a trained neural network model
            wherein the one or more processors, to train the neural network model, are to:
                repeatedly update the neural network model based on predictions provided by the neural network model, the predictions being based on the estimated occupational activity attribute values;
        receive a new activity description for a new role in an organization,
            wherein the new activity description includes information identifying activities associated with performing the new role;
        process the new activity description, with the trained neural network model, to generate estimated new activity attribute values;
        process the estimated new activity attribute values, with a logistic regression model, to generate probabilities that the new role is suitable for different workforce types,
            wherein the logistic regression model includes one or more of:
                a binary logistic regression model,
                a multiclass logistic regression model, or
                a regularized logistic regression model,
            wherein the different workforce types specify different types of workers, distinct from the different occupations, and wherein the one or more processors, when processing the estimated new activity attribute values, are to:
process the estimated new activity attribute values with a scoring-based attribute selection mechanism to reduce a total number of estimated new activity attribute values, the scoring-based attribute selection mechanism including one or more of:
a variance mechanism,
a spectral score mechanism,
a Laplace score mechanism,
an F-score mechanism,
a mutual information mechanism, or
a random selection mechanism;
determine a workforce recommendation for the new role based on the probabilities that the new role is suitable for the different workforce types; and
automatically perform an action based on the workforce recommendation.

2. The device of claim 1, wherein the one or more processors, when processing the occupational activity descriptions, are further to:
convert the one or more words further using word embedding.

3. The device of claim 1, wherein the one or more processors, when processing the occupational activity descriptions, are further to one of:
determine one or more patterns of the vectors using the convolution layer,
determine the weights for the vectors using the activation map, or
determine the sequences of the vectors using the plurality of long short term memory modules.

4. The device of claim 1, wherein the one or more processors, when determining the workforce recommendation for the new role, are to:
calculate a threshold based on the probabilities that the new role is suitable for the different workforce types;
compare the probabilities that the new role is suitable for the different workforce types to the threshold;
calculate financial benefits associated with particular roles that satisfy the threshold; and
determine the workforce recommendation for the new role based on the financial benefits.

5. The device of claim 1, wherein the workforce recommendation includes information indicating one or more workforce types for the new role.

6. The device of claim 1, wherein the trained neural network model includes:
a convolutional filter layer that determines a fixed number of patterns from the new activity description;
a max pooling layer that determines a maximum overlap between one of the patterns and a set of adjacent words in the new activity description;
recurrent layers that process the patterns;
a cross-activation map layer that generates weighted additive combinations of the processed patterns receive from the recurrent layers; and
dense layers that generate the estimated new activity attribute values based on the weighted additive combinations of the processed patterns.

7. The device of claim 1, wherein the neural network model comprises:
a deep neural network model, or
a multi-task learning deep neural network model.

8. A non-transitory computer-readable medium storing instructions, the instructions comprising:
one or more instructions that, when executed by one or more processors, cause the one or more processors to:
receive occupational activity descriptions and occupational role attributes from one or more occupational databases,
wherein the occupational activity descriptions include information identifying activities associated with different occupations, and
wherein the occupational role attributes include information identifying attributes of different roles associated with the different occupations;
process the occupational activity descriptions to generate estimated occupational activity attribute values for the occupational role attributes by converting one or more words in one or more of the occupational activity descriptions into vectors using at least one of:
a convolution layer,
weights for the vectors, determined using an activation map, or
sequences of the vectors, determined using a plurality of long short term memory modules,
wherein the estimated occupational activity attribute values indicate, for an occupational role attribute of the occupational role attributes, a measure of importance of the occupational role attribute to the different occupations, and
wherein the one or more instructions, that cause the one or more processors to process the occupational activity descriptions, further cause the one or more processors to:
perform scaling and noising techniques on the occupational role attributes to generate amended role attribute values; and
determine a result of comparing the estimated occupational activity attribute values and the amended role attribute values,
wherein the result of the comparing is used as training data for training a neural network model;
train the neural network model based on the result of the comparing to generate a trained neural network model
wherein the one or more instructions, that cause the one or more processors to train the neural network model, cause the one or more processors to:
repeatedly update the neural network model based on predictions provided by the neural network model, the predictions being based on the estimated occupational activity attribute values;
receive, from a user device, a new activity description for a new role in an organization,
wherein the new activity description includes information identifying activities associated with performing the new role;
process the new activity description, with the trained neural network model, to generate estimated new activity attribute values;
process the occupational role attributes, with a logistic regression model, to generate probabilities that roles are suitable for different workforce types,
wherein the logistic regression model includes one or more of:
a binary logistic regression model,
a multiclass logistic regression model, or a regularized logistic regression model, and
wherein the different workforce types specify different types of workers, distinct from the different occupations;
process the estimated new activity attribute values, with the logistic regression model, to generate probabilities that the new role is suitable for the different workforce types,
wherein the one or more instructions, that cause the one or more processors to process the estimated new activity attribute values, cause the one or more processors to:
process the estimated new activity attribute values with a scoring-based attribute selection mechanism to reduce a total number of estimated new activity attribute values, the scoring-based attribute selection mechanism including one or more of:
a variance mechanism,
a spectral score mechanism,
a Laplace score mechanism,
an F-score mechanism,
a mutual information mechanism, or
a random selection mechanism;
determine a workforce recommendation for the new role based on the probabilities that the roles are suitable for the different workforce types and the probabilities that the new role is suitable for the different workforce types; and
automatically perform an action based on the workforce recommendation.

9. The non-transitory computer-readable medium of claim 8, wherein the workforce recommendation includes information indicating one or more workforce types for the new role.

10. The non-transitory computer-readable medium of claim 8, wherein the trained neural network model includes:
a convolutional filter layer that determines a fixed number of patterns from the new activity description;
a max pooling layer that determines a maximum overlap between one of the patterns and a set of adjacent words in the new activity description;
recurrent layers that process the patterns;
a cross-activation map layer that generates weighted additive combinations of the processed patterns receive from the recurrent layers; and
dense layers that generate the estimated new activity attribute values based on the weighted additive combinations of the processed patterns.

11. The non-transitory computer-readable medium of claim 8, wherein the one or more instructions, that cause the one or more processors to determine the workforce recommendation for the new role, comprise:
one or more instructions that, when executed by the one or more processors, cause the one or more processors to:
calculate a threshold based on the probabilities that the new role is suitable for the different workforce types;
compare the probabilities that the roles are suitable for the different workforce types to the threshold;
calculate financial benefits associated with particular roles that satisfy the threshold; and
determine the workforce recommendation for the new role based on the financial benefits.

12. The non-transitory computer-readable medium of claim 8, wherein the one or more instructions, that cause the one or more processors to process the occupational activity descriptions, comprise:
one or more instructions that, when executed by the one or more processors, cause the one or more processors to:
perform scaling and noising techniques on the occupational activity descriptions to generate the estimated occupational activity attribute values.

13. The non-transitory computer-readable medium of claim 8, wherein the neural network model comprises:
a deep neural network model, or
a multi-task learning deep neural network model.

14. The non-transitory computer-readable medium of claim 8, wherein the one or more instructions, when executed by the one or more processors, further cause the one or more processors to one of:
determine one or more patterns of the vectors using the convolution layer,
determine the weights for the vectors using the activation map, or
determine the sequences of the vectors using the plurality of long short term memory modules.

15. A method, comprising:
receiving, by a device, occupational activity descriptions, occupational role attributes, and a new activity description for a new role in an organization,
wherein the occupational activity descriptions include information identifying activities associated with different occupations,
wherein the occupational role attributes include information identifying attributes of different roles associated with the different occupations, and
wherein the new activity description including information identifying activities associated with performing the new role;
processing, by the device, the occupational activity descriptions to generate estimated occupational activity attribute values for the occupational role attributes by converting one or more words in one or more of the occupational activity descriptions into vectors using at least one of:
a convolution layer,
weights for the vectors, determined using an activation map, or
sequences of the vectors, determined using a plurality of long short term memory modules,
wherein the estimated occupational activity attribute values indicate, for an occupational role attribute of the occupational role attributes, a measure of importance of the occupational role attribute to the different occupations, and
wherein processing the occupational activity descriptions comprises:
performing scaling and noising techniques on the occupational role attributes to generate amended role attribute values; and
determining a result of comparing the estimated occupational activity attribute values and the amended role attribute values,
where the result of the comparing is used as training data for training a first model;
training, by the device, the first model based on the result of the comparing and the estimated occupational activity attribute values to generate a trained first model, wherein training the first model comprises:

repeatedly updating the first model based on predictions provided by the first model, the predictions being based on the estimated occupational activity attribute values;

processing, by the device, the new activity description, with the trained first model, to generate estimated new activity attribute values;

processing, by the device, the occupational role attributes, with a logistic regression model, to generate probabilities that roles are suitable for different workforce types, wherein the logistic regression model includes one or more of:
  a binary logistic regression model,
  a multiclass logistic regression model, or
  a regularized logistic regression model, and wherein the different workforce types specify different types of workers, distinct from the different occupations;

processing, by the device, the estimated new activity attribute values, with the logistic regression model, to generate probabilities that the new role is suitable for the different workforce types,
  wherein processing the estimated new activity attribute values comprises:
    processing the estimated new activity attribute values with a scoring-based attribute selection mechanism to reduce a total number of estimated new activity attribute values, the scoring-based attribute selection mechanism including one or more of:
      a variance mechanism,
      a spectral score mechanism,
      a Laplace score mechanism,
      an F-score mechanism,
      a mutual information mechanism, or
      a random selection mechanism;

determining, by the device, a workforce recommendation for the new role based on the probabilities that the roles are suitable for the different workforce types and the probabilities that the new role is suitable for the different workforce types; and automatically performing, by the device, an action based on the workforce recommendation.

16. The method of claim 15, wherein processing the occupational activity descriptions further comprises:

performing scaling and noising techniques on the occupational activity descriptions to generate the estimated occupational activity attribute values.

17. The method of claim 15, wherein determining the workforce recommendation for the new role comprises:
  calculating a threshold based on the probabilities that the new role is suitable for the different workforce types;
  comparing the probabilities that the roles are suitable for the different workforce types to the threshold;
  calculating financial benefits associated with particular roles that satisfy the threshold; and
  determining the workforce recommendation for the new role based on the financial benefits.

18. The method of claim 15, wherein the first model includes one or more of:
  a deep neural network model, or
  a multi-task learning deep neural network model.

19. The method of claim 15, wherein the workforce recommendation includes information indicating one or more workforce types for the new role.

20. The method of claim 15, wherein the first model includes:
  a convolutional filter layer that determines a fixed number of patterns from the new activity description;
  a max pooling layer that determines a maximum overlap between one of the patterns and a set of adjacent words in the new activity description;
  recurrent layers that process the patterns;
  a cross-activation map layer that generates weighted additive combinations of the processed patterns receive from the recurrent layers; and
  dense layers that generate the estimated new activity attribute values based on the weighted additive combinations of the processed patterns.

21. The method of claim 15, further comprising at least one of:
  determining one or more patterns of the vectors using the convolution layer,
  determining the weights for the vectors using the activation map, or
  determining the sequences of the vectors using the plurality of long short term memory modules.

* * * * *